Patented May 28, 1940

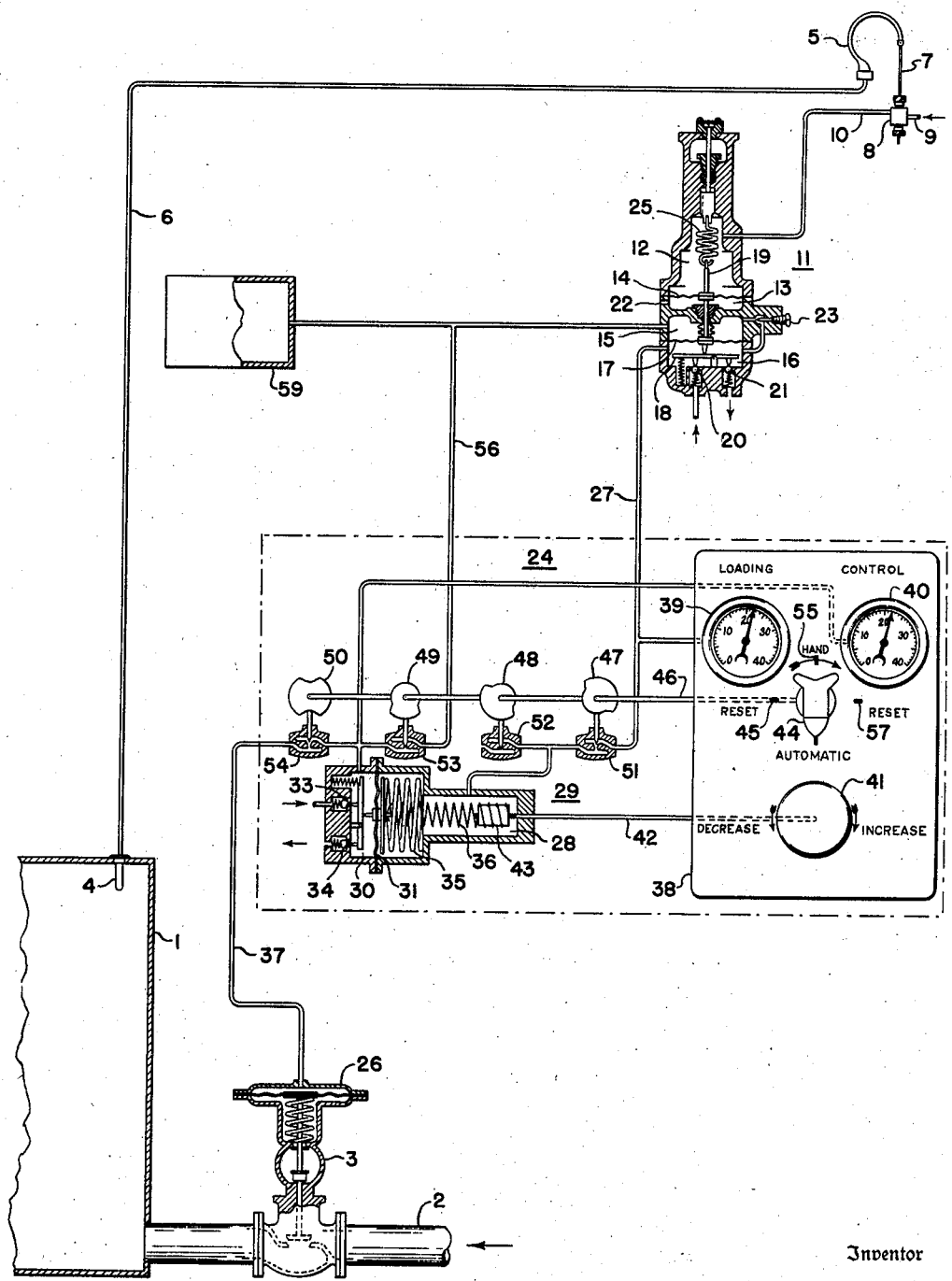

2,202,485

UNITED STATES PATENT OFFICE 2,202,485

CONTROL SYSTEM

Edward W. Fitch, University Heights, Ohio, assignor to Bailey Meter Company, a corporation of Delaware Application June 5, 1937, Serial No. 146,697

23 Claims. (Cl. 236—82)

This invention relates to control systems for maintaining a condition such as pressure, temperature, liquid level, speed, or electromotive force at or approximately at a predetermined value through regulating the rate of application of a corrective agent maintaining, producing, or otherwise affecting the condition. More particularly my invention relates to automatic control systems wherein a device responsive to the controlled condition establishes a control effect for positioning a valve or other regulating device directly affecting the rate of application of the agent.

Such control systems are usually applied to energy producing or utilizing apparatus wherein the value of the controlled condition is indicative of the energy level in the apparatus. Under certain demands for energy the apparatus may become temporarily upset, so that the control system will not function correctly. In starting operation of such apparatus temporary conditions may obtain with which the control system is unable to cope. During such periods it is desirable that the regulating device be controlled independently of the control effect initiated by the condition responsive device as by an operator or attendant. Such operation is commonly spoken of as "remote manual control" or "hand control" in that the regulating device is not directly positioned by the operator, but a control effect established by the operator positions the regulating device. During the period that the control of the corrective agent is by hand the control effect initiated by the condition responsive device is rendered inoperative for positioning the regulating device.

In order that the controlled condition will be maintained at the predetermined or desired value regardless of the energy demand on the apparatus, such control systems usually function to continuously position the regulating device from the instant of departure of the controlled condition from the desired value to the instant of its restoration. There is, therefore, a functional relation between the magnitude of the control effect and the time duration of the departure from the predetermined value of the controlled condition. That is, assuming that a departure of predetermined amount exists, then at the end of one minute a control effect of certain magnitude will have been established by the condition responsive device, at the end of two minutes a control effect of greater magnitude will have been established, and so on until the maximum control effect is reached, notwithstanding that during this period the amount of departure has remained constant.

During periods when the apparatus is under hand control unless the controlled condition is maintained precisely at the desired value the control effect will so continue to vary. Upon switching from hand to automatic control the control effect will therefore be sufficient to move the regulating device to an extreme position regardless of the fact that at the termination of the hand control period the controlled condition is returned to the desired value. Before the regulating device is moved to the position necessary to maintain the controlled condition at the desired value for the then existing energy demand the condition will have departed from the desired value. Such sudden changes in the rate of application of the corrective agent bearing no relation to changes in energy demand may furthermore create violent oscillations in the value of the controlled condition, continuing indefinitely and with which the control system is unable to cope. A particular feature of my invention resides in the means I have provided for preventing the control effect established by the condition responsive device from drifting to an extreme during periods of hand operation. While I will describe my invention as applied to a control system wherein the control effect established by the condition responsive device is a variable fluid pressure it will be obvious that its teachings are equally applicable to control systems producing a variable fluid volume or electromotive force, for example.

Referring to the drawing, which is a diagrammatic illustration of a control system embodying my invention, I therein show an energy utilizing device such as a tank 1, which is maintained at a predetermined or desired temperature by a heating fluid such as steam supplied through a conduit 2 in which is located a regulating valve 3.

The temperature within the tank 1 is determined by means of a thermometric system comprising a bulb 4 connected to a Bourdon tube 5 by means of a capillary 6. The bulb 4, Bourdon tube 5 and capillary 6 are filled with an inert gas, liquid or vapor, so that the pressure therein varies in consonance with variations in temperature within the tank 1. As the temperature within the tank 1 increases, the free end of the Bourdon tube 5 is positioned in a counterclockwise direction, and as the temperature decreases, in a clockwise direction. Through the agency of devices hereinafter to be described, the valve 3 is positioned by a fluid pressure established by the Bourdon tube 5 to vary the rate of flow of heating fluid to maintain the temperature within the tank 1 at the desired value.

Positioned by the free end of the Bourdon tube 5 is the movable valve stem 7 of a pilot valve 8 illustrated as being of the type forming the subject matter of a United States patent to Clarence Johnson dated September 15, 1936, No. 2,054,464. Pressure fluid such as compressed air is admitted to the pilot valve 8 through an inlet pipe 9. A pressure proportional to the position of the stem 7 is established in an outlet pipe 10. That is, as shown in the drawing, as the stem 7 is positioned upwardly the pressure within the pipe 10 increases proportionately, and as the stem is moved downwardly the pressure within the pipe 10 decreases proportionately. Accordingly, for every temperature within the tank 1 there is a predetermined definite pressure established within the pipe 10.

The pipe 10 serves to transmit pressures to a standardizing relay 11, shown as being of the type forming the subject matter of a United States patent application to Harvard H. Gorrie, Serial No. 8,047, filed February 25, 1935 which eventuated in Patent No. 2,098,914 dated November 9, 1937. The relay 11 comprises a pair of chambers 12 and 13 separated by a pressure sensitive diaphragm 14 and a second pair of chambers 15 and 16 separated by a pressure sensitive diaphragm 17. Pressure fluid from any suitable source (not shown) is admitted to the chamber 16 through an inlet or supply valve 20 and exhausted therefrom through an exhaust or waste valve 21. Normally, valves 20 and 21 are closed. Tilting of a spring loaded fulcrumed beam 18 in one direction opens the valve 20 and tilting in the opposite direction opens the valve 21. The beam 18 is actuated by a member 19 operatively connecting diaphragms 14 and 17. Downward movement of the member 19 from the position shown serves to open the valve 20, thereby admitting pressure fluid to the chamber 16. Conversely, upward movement of the member 19 serves to open the valve 21, exhausting pressure fluid from the chamber 16.

The effective force acting on the diaphragm 17 is proportional to the difference in pressures within chambers 15 and 16. Likewise the effective force acting upon the diaphragm 14 is proportional to the difference in pressures within chambers 12 and 13. As shown, the chamber 13 is open to the atmosphere through a port 22, so that the pressure therein remains substantially constant.

The relay 11 is adjusted by means of a spring 25 so that with equal pressures existing within chambers 15 and 16, and the pressure established by the pilot 8 at a value corresponding to the desired value of the temperature within the tank 1, the valves 20 and 21 are closed. Upon an increase in temperature above the desired value the pressure within the chamber 16 has increased proportionately and inlet valve 20 will open until the pressure within the chamber 16 has increased a proportionate amount, or until the force acting upwardly on the diaphragm 17 again balances that acting downwardly on the diaphragm 14, when equilibrium will be restored.

Chambers 15 and 16 are shown in communication through an adjustable bleed valve 23. When the pressure within chamber 16 is increased to restore equilibrium, pressure fluid will slowly seep through the valve 23, increasing the pressure within chamber 15. As the pressure within chamber 15 increases the upwardly acting force on diaphragm 17 will decrease, causing valve 20 to again open and increase the pressure within chamber 16 still further. Such regenerative action will continue as long as the temperature remains above the desired value, the fluid pressure within the chamber 16 gradually increasing at a rate dependent upon the extent of departure of the temperature from the desired value. As the temperature returns toward the desired value, the pressure within chamber 16 is decreased proportionately, and when the temperature is again at the desired value the pressure within chamber 16 will be equal to that within chamber 15, although at a different magnitude than existed previous to the original departure of the temperature from the desired value.

Upon a decrease in temperature below the desired value the reverse action occurs. The fluid pressure within chamber 16 is first reduced an amount proportional to the decrease in temperature and thereafter, due to the differential thus established between chambers 15 and 16, continuously reduced at a rate proportional to the decrease in temperature until the desired value of temperature is again restored.

The fluid pressure established in the chamber 16 therefore bears a functional relation to the time length of departure of the controlled condition from the desired value. Assuming, for example, that the temperature within the tank 1 departs one degree from that desired, then at the end of the first minute the pressure within chamber 16 will have changed a predetermined amount, at the end of the second minute a further predetermined amount, which action will continue until the temperature returns to the desired value. If the departure in temperature from the desired value exists over an extended period of time, the pressure within chamber 16 will ultimately be equal to that upon the inlet side of inlet valve 20, or be reduced to that of the atmosphere.

The control effect, that is the pressures established within the chamber 16, are normally effective for operating a spring loaded diaphragm servo-motor 26 positioning the valve 3. Under hand control, the pressures within chamber 16 are rendered ineffective for operating the servo-motor 26, and in place thereof are substituted pressures established by an attendant or operator, through mechanism hereinafter to be described. During such periods of hand operation, if the temperature within the tank 1 is maintained above or below the desired value but a small amount over an extended period of time it is apparent that the pressure within the chamber 16 will increase or decrease respectively to or even beyond the predetermined maximum or minimum pressure necessary to move the valve 3 to an extreme position. When then the control is returned to automatic, the valve 3 will be positioned to an extreme position, causing an abrupt change in the rate of energy input into the tank 1, which may set up oscillations in the temperature, continuing indefinitely. A particular feature of my invention resides in the means I have provided for arresting the secondary or regenerative action of the standardizing relay 11 during periods of hand control, so that at the instant the control is returned to automatic the pressure within the chamber 16 will differ from that manually established only by an amount proportional to the departure of the controlled condition from the desired value. The change over may then be completed without in any way upsetting the apparatus. I accomplish this by maintaining within chamber 15 (during periods of hand operation) a pressure equal to that established manually and effective within the servo-motor 26.

An inspection of the relay 11 will indicate that it is in equilibrium, that is valves 20 and 21 are closed, when equal pressures within chambers 15 and 16 exist and the pressure within chamber 12 counterbalances the force produced by the spring 25, which by adjustment is equal to the force produced by the pressure therein when the temperature within the tank 1 is at the desired value; or when the differential between chambers 15 and 16 produces a forces equivalent to that produced by the difference between the force of the spring 25 necessary to maintain equilibrium and that produced by the fluid pressure within the chamber 12. It is apparent, therefore, that if a pressure within chamber 15 is maintained equal to that within the servo-motor 26, then the pressure within chamber 16 will differ therefrom by an amount proportional to the difference between the actual fluid pressure in chamber 12 and that produced when the temperature is at the desired value. As usually the temperature will be at the desired value when the control is transferred from hand to automatic it follows that the pressure within chamber 16 will be equal to that within the servo-motor 26 so that no positioning of the valve 3 will occur at such time.

The collective mechanisms I employ for transferring from hand to automatic control, or vice versa, are conveniently designated as a "selector valve" generally indicated at 24 and enclosed by the dot-line. As shown, fluid pressures within the chamber 16 are transmitted through a pipe 27 to a chamber 28 of a relay 29 in some aspects similar to the standardizing relay 11. The chamber 28 is separated from a chamber 30 by a diaphragm 31 arranged to operate a pressure fluid inlet valve 33 upon movement in one direction, and an exhaust valve 34 upon movement in opposite direction. Within chamber 28 is a compression spring 35 and a tension spring 36. Normally the force produced by the spring 35 is counterbalanced by that produced by the spring 36 so that the diaphragm 31 is positioned from the neutral position solely by the difference in pressures within chambers 28 and 30. Upon an increase in pressure transmitted through pipe 27 to the chamber 28, for example, inlet valve 33 will open until the pressure within chamber 30 has increased a proportionate amount, when the diaphragm 31 will be restored to the neutral position. Conversely, upon a decrease in pressure within the chamber 28 the waste valve 34 will open until the pressure within the chamber 30 has decreased a proportionate amount. Fluid pressures within the chamber 30 are transmitted to the diaphragm servo-motor 26 through a pipe 37.

The selector valve 24 is provided with manually operated devices so that the loading pressures within the chamber 30 may be established by hand and varied at the will of an operator independently of the loading pressures established by the pilot 8. Such devices for transferring from automatic to hand control, or vice versa, are mounted for convenience on a plate 38 upon which may be inscribed suitable descriptive legends, so that an operator is instantly advised of the existing status of the control system at any time. The pressure within the pipe 27 which is for convenience termed "loading pressure" is indicated by a gage 39, and that within the chamber 30, termed "control pressure," by a gage 40. With the control on automatic the control pressure usually will agree with the loading pressure, whereas with the control on hand there is no relation between the two. A predetermined difference between the two pressures may be maintained with the control on automatic, however, by varying the tension of the spring 36 to place a given load on diaphragm 31. This is accomplished by rotating a hand wheel 41 in one direction or the other. This serves to rotate a shaft 42 and move a block 43 to which the spring 36 is secured.

Upon transferring from automatic to hand control a transfer switch 44 is first moved in the direction of the arrow to a reset position 45. The transfer switch 44 positions a cam shaft 46 on which are mounted cams 47, 48, 49 and 50 operating valves 51, 52, 53 and 54 respectively. Movement of the transfer switch 44 to the reset position 45 serves to close the valve 51, open valves 52, 53 and close valve 54. Closure of valve 51 serves to cut off the pipe 27 from the chamber 28, which is now vented to the atmosphere through valve 52. Closure of the valve 54 traps the pressure fluid within pipe 37 so that the servo-motor 26 is substantially locked in position. With the transfer switch 44 in the reset position 45 it is possible for an operator to make whatever adjustments are advisable without in any way affecting the position of the valve 3, or otherwise upsetting the control system. Usually with transfer switch 44 in this position the wheel 41 is turned until the existing control pressure is equal to the control pressure which existed immediately prior to the transfer. Then upon completion of the transfer to hand control, accomplished by positioning the transfer switch 44 to a hand position 55 to open valve 54, no sudden movement of the servo-motor 26 occurs, thereby preventing the possibility of the entire system being upset.

Valve 53 connects by way of a pipe 56 to the chamber 15 of the standardizing relay 11. Upon valve 53 being opened when the transfer switch 44 is turned to reset position 45 the pressure within the chamber 15 is immediately brought to that of the chamber 30, as the capacities of valves 33, 34 are such as to render negligible the effect of the bleeding of pressure fluid from or to the chamber 15 through valve 23. At all times, therefore, when the valve 53 is open, the pressure within chamber 15 will be equal to that within chamber 30.

With the transfer switch 44 in hand position 55, the position of the valve 3 may be varied as desired by manipulation of hand wheel 41 without the pressure in chamber 15 exercising any influence whatsoever. The regenerative action of chamber 15 hereinbefore described will likewise be eliminated or arrested, due to the fact that the pressure therein is controlled by the pressure within the chamber 30 and the bleed of pressure fluid between chambers 15 and 16 will be ineffective for producing continuing changes in pressure within chamber 16. Without the connection 56 from chamber 30 to chamber 15 it is apparent that while on hand control if the loading pressure established by the pilot 8 deviated from that corresponding to the desired magnitude of the controlled condition, the regenerative action produced by the bleed valve 23 and chamber 15 would cause the pressure within the pipe 27 to continue to change until an operating limit was reached. Accordingly when the control was returned to automatic the valve 3 would immediately position to one extreme or another, thereby effecting a sudden change in the rate of heat input to the chamber 1. Such sudden change in the rate of heat input bearing no relation to the demand for energy would possibly affect the control system so that the temperature would continuously rise and fall above and below the desired value in a well defined cycle. By providing the connection 56 between chambers 15 and 30, if the controlled condition is brought to the desired value before the transfer from hand to automatic control, the pressure within the chamber 16 will be the same as that within the chamber 30 and the transfer may be consummated without a sudden shifting in the position of valve 3. In the event that the temperature within the tank 1 does not agree precisely with that desired at the time of the transfer, then the pressure within the chamber 16 will be different from that within the chamber 30 by a relatively small amount and proportional solely to the departure of the critical temperature from the desired value.

When the control is restored to automatic the transfer switch 44 is first turned to reset position 57. In this position valve 51 is open, valve 52 closed, valve 53 open and valve 54 closed. The operator then observing on gage 39 the loading pressure established in the chamber 16 manipulates the wheel 41 to bring the control pressure as indicated by gage 40 to the identical value. Such manipulation may be performed without in any way affecting the pressure within the pipe 37 and servo-motor 26, due to the fact that the valve 54 is closed. After the two pressures indicated by gages 39 and 40 respectively are brought into agreement, the transfer switch 44 is turned to automatic position 58, when valve 51 is open, valve 52 closed, valve 53 closed and valve 54 open. In this position pressures established within the chamber 16 are transmitted through pipe 27 to chamber 28 and are effective for positioning the valve 3. Likewise, due to the fact that the valve 53 is now in closed position the bleed of pressure fluid through valve 23 serves to produce continuing changes in pressure within the chamber 16 whenever the temperature within the tank 1 departs from the predetermined or desired value.

Normally the pressure difference existing across the valve 53 is relatively small, so that the effect of a small leakage of pressure fluid therethrough when the control is on automatic is negligible. However, to prevent relatively abrupt changes of the pressure within chamber 15 I may, as shown, connect to the pipe 56 a volume chamber such as indicated at 59.

While I have illustrated and described certain embodiments of my invention, it will be understood that I do not intend to be limited other than by what I claim in view of the prior art.

What I claim as new and desire to secure by Letters Patent of the United States, is:

1. In a fluid pressure operated control system, in combination, means for producing changes in a fluid pressure proportional to changes in the magnitude of a condition, regenerative means including at least a part of said last named means for producing continuing changes in said fluid pressure, regulating means of an agent producing or maintaining said condition normally under the control of said fluid pressure, manually operable means for establishing a second fluid pressure, and a second manually operable means for placing said regulating means under the control of said second fluid pressure and simultaneously rendering said regenerative means ineffective to produce continuing changes in said fluid pressure.

2. In a fluid pressure operated control system, in combination, a first chamber, valve means for varying the fluid pressure in said chamber, means for actuating said valve means to produce changes in the fluid pressure within said chamber in accordance with changes in the magnitude of the condition, a second chamber, a pressure transmitting connection between said first and second chambers, means for actuating said valve means to maintain a predetermined pressure difference between said first and second chambers, regulating means of an agent for producing or maintaining said condition normally under the control of the fluid pressure in said first chamber, manually operable means for establishing a second fluid pressure, a second manually operable means for placing said regulating means under the control of said second fluid pressure, and a third manually operable means for introducing said second fluid pressure into said second chamber.

3. In a fluid pressure operated control system, in combination, a casing defining a first and a second chamber separated by a pressure sensitive flexible partition, a third and a fourth chamber separated by a second pressure sensitive flexible partition, means operatively connecting said flexible partitions, a supply and waste valve controlling a fluid pressure in said fourth chamber under the control of said last named means, a sluggish connection between said third and forth chambers, means for establishing a fluid pressure proportional to the magnitude of a variable effective in said first chamber, regulating means of an agent producing or maintaining said variable normally under the control of the fluid pressure in said fourth chamber, manually operated means for establishing a second fluid pressure, manually operated means for rendering the fluid pressure in said fourth chamber ineffective for controlling said regulating means, and means operated in unison with said last named means for introducing said second fluid pressure into said third chamber.

4. In a control system for maintaining a condition at a predetermined value, in combination, a fluid pressure conduit, valve means having a neutral position in said conduit for controlling admission to and waste of pressure fluid therefrom, means for displacing said valve means from the neutral position to admit pressure fluid to said conduit upon a change in magnitude of said condition in one sense and to waste fluid pressure from said conduit upon a change in magnitude of said condition in opposite sense, means tending to restore said valve means to the neutral position controlled by the pressure fluid within said conduit, regenerative means controlled by the pressure of the fluid in the conduit tending to prevent the valve means from remaining in neutral position until the condition attains a predetermined value, manually operated means for establishing a second fluid pressure, and manually operated means for placing said regenerative means under the control of said second fluid pressure.

5. In a control system of the fluid pressure actuated type, means for producing variations in a fluid pressure corresponding to changes in the condition to be controlled, a servo-motor for regulating the application of a corrective agent producing or maintaining the condition normally under the control of said fluid pressure, means for producing a second variable fluid pressure, selective means for rendering said first fluid pressure ineffective to control said servo-motor and said second fluid pressure effective to control said servo-motor, and means sensitive to said second fluid pressure for maintaining said first fluid pressure substantially equal to said second fluid pressure while said servo-motor is controlled by said second fluid pressure.

6. In a control system of the fluid pressure actuated type, means for producing variations in a fluid pressure corresponding to changes in the condition to be controlled, a servo-motor for regulating a corrective agent for producing or maintaining the condition normally under the control of said fluid pressure, a selective device for transferring control of said servo-motor from said fluid pressure to a manually controllable fluid pressure, and means for producing variations in said fluid pressure corresponding to changes in said manually controllable fluid pressure while said servo-motor is controlled thereby so that said fluid pressure remains substantially equal to said manually controlled fluid pressure.

7. In a control system of the fluid pressure actuated type, means for producing variations in a fluid pressure corresponding to changes in the condition to be controlled, a servo-motor for regulating the rate of application of a corrective agent producing or maintaining the condition normally under the control of said fluid pressure, a selective device for transferring control of said servo-motor from said fluid pressure to a manually controllable fluid pressure and including means for rendering said first named means responsive to the manually controllable fluid pressure while said servo-motor is controlled thereby so that said fluid pressure remains substantially equal to said manually controllable fluid pressure.

8. In a control system of the fluid pressure actuated type, means for producing variations in a fluid pressure corresponding to the conditions to be controlled, a servo-motor for regulating a corrective agent producing or maintaining said condition normally under the control of said fluid pressure, a selective device for transferring control of said servo-motor from said fluid pressure to a second variable fluid pressure, and means for producing variations in said first named fluid pressure corresponding to changes in said second fluid pressure while said servo-motor is controlled thereby.

9. In a control system of the fluid pressure actuated type having means for producing immediate primary variations in a fluid pressure corresponding to changes in the condition to be controlled and secondary means responsive to said fluid pressure for producing a slow continuing change in the fluid pressure and a servo-motor normally under the control of said fluid pressure, a selector valve for transferring control of said servo-motor to a manually established fluid pressure and including means for rendering said secondary means responsive to said manually established fluid pressure so that said first named fluid pressure is maintained substantially at the magnitude of said manually established fluid pressure while said servo-motor is controlled by said manually established fluid pressure.

10. In a fluid pressure operated control system, in combination, means for producing changes in a first fluid pressure proportional to changes in the magnitude of a condition, regenerative means actuated by said first fluid pressure for producing continuing changes in said first fluid pressure, regulating means of an agent producing or maintaining said condition normally under the control of said fluid pressure, means for rendering said fluid pressure ineffective to control said regulating means, means for establishing a second fluid pressure to control said regulating means, and means to maintain said first fluid pressure substantially at the magnitude of said second fluid pressure comprising means for actuating said regenerative means by said second fluid pressure.

11. In a control system of the fluid pressure actuated type having means for producing immediate primary variations in a fluid pressure corresponding to changes in the condition to be controlled and secondary means responsive to said fluid pressure for producing a continuous change in the fluid pressure at a rate proportional to the amount of deviation of the condition from the desired value, and a servo-motor for regulating the supply of a corrective agent producing or maintaining said condition normally under the control of said fluid pressure, means for severing control of said servo-motor by said fluid pressure, means for establishing a second fluid pressure initially substantially equal to the first fluid pressure effective for controlling said servo-motor and means for rendering said secondary means responsive to said second fluid pressure so that said first fluid pressure may be maintained substantially at the magnitude of the second fluid pressure when said servo-motor is controlled by the second fluid pressure.

12. In a control system of a fluid pressure actuated type, means for producing immediate primary variations in a fluid pressure corresponding to changes in the condition to be controlled, regenerative means responsive to the fluid pressure for producing a continuing change in the fluid pressure, restricted means for causing said regenerative means to have a slow response to the fluid pressure, a servo-motor normally under the control of said fluid pressure; a selector valve for transferring control of said servo-motor from said fluid pressure to a manually controllable fluid pressure and means for rendering said regenerative means responsive to said manually controllable fluid pressure so that changes in the manually controllable fluid pressure produce immediate and proportionate changes in said fluid pressure and said fluid pressure is maintained substantially equal to the manually controllable fluid pressure while said servo-motor is controlled by said manually controllable fluid pressure.

13. In a control system for varying the rate of application of a corrective agent to maintain a condition at a predetermined value, in combination, a member movable from a neutral position in accordance with deviations in the controlled condition from the predetermined value, means under the control of said member for producing a control effect varying in magnitude in accordance with the time duration of the displacement of said member from the neutral position, a servo-motor normally actuated by said control effect for regulating the application of the corrective agent, means for producing a second variable control effect independent of said first effect, a selective device for placing said servo-motor under the control of the second control effect and rendering the first control effect ineffective to control the servo-motor, and means actuated by said second control effect for producing changes in the magnitude of the first control effect corresponding to changes in the second control effect while said servo-motor is controlled thereby.

14. In a control system of the fluid pressure actuated type having means for producing variations in the fluid pressure corresponding to changes in the condition to be controlled, and a servo-motor for regulating the rate of application of a corrective agent normally controlled by said fluid pressure, the method of transferring control of said servo-motor to a second variable fluid pressure which includes rendering said first fluid pressure ineffective to control the servo-motor, making said second fluid pressure effective for controlling the servo-motor and producing changes in the first fluid pressure proportional to changes in the second fluid pressure while the servo-motor is controlled by the second fluid pressure.

15. In a control system of the fluid pressure actuated type having means for producing variations in the fluid pressure corresponding to changes in the condition to be controlled and a servo-motor for regulating the rate of application of a corrective agent normally controlled by said fluid pressure, the method of transferring control of the servo-motor to a second variable fluid pressure which includes rendering the fluid pressure produced by said means ineffective to control the servo-motor, making the second fluid pressure substantially equal to the fluid pressure produced by said means, making the second fluid pressure effective for controlling the servo-motor and thereafter producing changes in the fluid pressure produced by said means equal to variations in the second fluid pressure so that the fluid pressure produced by said means will remain substantially equal to the second fluid pressure while the servo-motor is controlled by the second fluid pressure.

16. In a control system of the fluid pressure actuated type having means for producing variations in a fluid pressure corresponding to changes in a condition to be controlled and a servo-motor normally under the control of the fluid pressure, the method of control while the servo-motor is controlled by a second variable fluid pressure which includes rendering said means responsive to the second fluid pressure so that changes in the first named fluid pressure will occur substantially equal to changes in the second fluid pressure while the servo-motor is controlled by the second fluid pressure.

17. In a control system of the fluid pressure actuated type having means for producing variations in a fluid pressure corresponding to changes in a condition to be controlled and secondary means responsive to said fluid pressure for producing a slow continuing change in the fluid pressure and a servo-motor normally under the control of said fluid pressure, a method of transferring control of said servo-motor to a second variable fluid pressure which includes rendering said secondary means responsive to the second fluid pressure so that the continuing change in the first fluid pressure does not occur while the servo-motor is controlled by the second fluid pressure.

18. In a control system of the fluid pressure actuated type having means for producing primary variations in a fluid pressure corresponding to changes in the condition to be controlled and secondary means responsive to the fluid pressure for producing a slow continuous change in the fluid pressure subsequent to the first named changes and a servo-motor for regulating the rate of application of a corrective agent producing or maintaining said condition and including means for severing the servo-motor from control by said fluid pressure and thereafter substituting a manually controllable fluid pressure initially equal to said first fluid pressure, the method of operating the control system while the servo-motor is controlled by said manually controllable fluid pressure which includes, rendering said secondary means responsive to the manually controllable fluid pressure so that said secondary means thereafter produces changes in the first fluid pressure proportional to changes in the manually controllable fluid pressure and the first fluid pressure is maintained substantially equal to the manually controllable fluid pressure while the servo-motor is controlled by the manually controllable fluid pressure.

19. In a control system of the fluid pressure actuated type, a first means for producing variations in a first fluid pressure, a servo-motor normally under the control of said first fluid pressure, a second means for producing variations in a second fluid pressure, a selector device for changing control of said servo-motor from said first fluid pressure to said second fluid pressure and vice versa, and means controlled by said selector device for adjusting the fluid pressure established by the means to which change is to be made so as to cause said means to produce a pressure substantially equal to that produced by the means from which change is to be made.

20. In a control system of the fluid pressure actuated type, a first means for producing variations in a first fluid pressure, a servo-motor under the control of said fluid pressure, a second means for producing variations in a second fluid pressure, a selector device for changing control of said servo-motor from said first fluid pressure to said second fluid pressure and vice versa, and means responsive to the fluid pressure transmitted to said servo-motor for adjusting the fluid pressure established by the means to which change is to be made so as to cause said means to produce a pressure substantially equal to that produced by the means from which change is to be made.

21. In a control system of the fluid pressure actuated type, a first means for producing variations in a first fluid pressure, a servo-motor under the control of said fluid pressure, a second means for producing variations in a second fluid pressure, a selector device for changing control of said servo-motor from said first fluid pressure to said second fluid pressure and vice versa, and means controlled by said selector device and responsive to the fluid pressure transmitted to said servo-motor for adjusting the fluid pressure established by the means to which change is to be made so as to cause said means to produce a pressure substantially equal to that produced by the means from which change is to be made.

22. In a control system of the fluid pressure actuated type, means for producing variations in a fluid pressure corresponding to changes in a condition to be controlled, a servo-motor for regulating the rate of application of a corrective agent for producing or maintaining the condition normally under the control of said fluid pressure, a selector device for transferring control of said servo-motor from said fluid pressure to a manually controllable fluid pressure and vice versa; and means controlled by said selector device for adjusting the fluid pressure established by said first named means so as to cause said first named means to produce a fluid pressure substantially equal to that produced by said manually controllable means while said servo-motor is responsive to said manually controllable fluid pressure.

23. In a control system of the fluid pressure actuated type, means for producing variations in a fluid pressure corresponding to changes in a condition to be controlled, a servo-motor for regulating the rate of application of a corrective agent producing or maintaining the condition normally under the control of said fluid pressure, a selector device for transferring control of said servo-motor from said fluid pressure to a manually controllable fluid pressure and vice versa; and means responsive to the pressure established by said manually controllable means for adjusting the fluid pressure established by said first named means so as to cause said first named means to produce a fluid pressure substantially equal to that produced by said manually controllable means while said servo-motor is responsive to said manually controllable fluid pressure.

EDWARD W. FITCH.